United States Patent [19]
Charron

[11] Patent Number: 6,069,411
[45] Date of Patent: May 30, 2000

[54] ANTI-THEFT METHOD FOR A VEHICLE USING A PORTABLE TELEPHONE

[75] Inventor: Didier Charron, Monce en Belin, France

[73] Assignee: U.S. Philips Corporation, New York, N.Y.

[21] Appl. No.: 09/184,392

[22] Filed: Nov. 2, 1998

[30] Foreign Application Priority Data

Nov. 4, 1997 [FR] France .................................. 97 13850

[51] Int. Cl.[7] .......................... H04M 11/00; B60R 25/00
[52] U.S. Cl. ...................... 307/10.5; 307/10.2; 307/10.3; 180/287; 455/411; 455/557
[58] Field of Search ................... 307/10.5, 10.4, 307/10.3, 10.2; 340/426; 455/557, 411; 379/91.01; 180/287

[56] References Cited

U.S. PATENT DOCUMENTS

| | | | |
|---|---|---|---|
| 5,225,713 | 7/1993 | Henneberry et al. | 307/102 |
| 5,396,216 | 3/1995 | Morgan | 307/10.3 |
| 5,550,897 | 8/1996 | Seiderman | 379/91.01 |
| 5,585,779 | 12/1996 | Halikias | 340/426 |
| 5,608,272 | 3/1997 | Tanguay | 180/287 |
| 5,625,671 | 4/1997 | Salin | 455/411 |

*Primary Examiner*—Albert W. Paladini
*Attorney, Agent, or Firm*—Dicran Halajian

[57] ABSTRACT

The invention relates to an anti-theft method for a vehicle. In accordance with the invention, a code word (K1) chosen by the user, and the serial number ESN or IMEI of the telephone (K2) are stored in a fastener element (4) connected to the vehicle (5) and serving as a cradle for the portable telephone (1). Before starting, the user is to put his telephone in its place in the fastener element. The telephone automatically verifies whether its serial number ESN or IMEI is identical with the one that is stored in the fastener element. In that case, the starter means of the vehicle are unblocked so that the action of the ignition key makes a start possible. In the opposite case, the starter means remain blocked.

8 Claims, 2 Drawing Sheets

ANTI-THEFT METHOD FOR A VEHICLE USING A PORTABLE TELEPHONE

FIELD OF THE INVENTION

The invention relates to an anti-theft method for a vehicle with starter means, said method comprising a blocking/unblocking step of said starter means and utilizing a portable telephone. The invention also relates to a portable telephone for implementing said method and a fastener element for fastening such a portable telephone to a vehicle.

BACKGROUND OF THE INVENTION

U.S. Pat. No. 5,225,713 describes an apparatus which permits the start of a vehicle to be prevented when its use is not permitted. This apparatus is controlled by the DTMF frequencies generated by a cellular telephone when the user dials a number. The apparatus compares the frequencies generated with a sequence of pre-recorded frequencies and decides in response to this comparison to block or unblock the starter means of the vehicle.

The user is thus obliged to dial his code on his cellular telephone each time the vehicle is started, which is annoying.

SUMMARY OF THE INVENTION

The invention particularly has for its object to propose an anti-theft method which does not have this drawback.

For this purpose, an anti-theft method according to the invention and as described in the opening paragraph is characterized in that it comprises a verification step for verifying at least one characteristic of said telephone automatically used during the time the telephone is connected to the vehicle.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
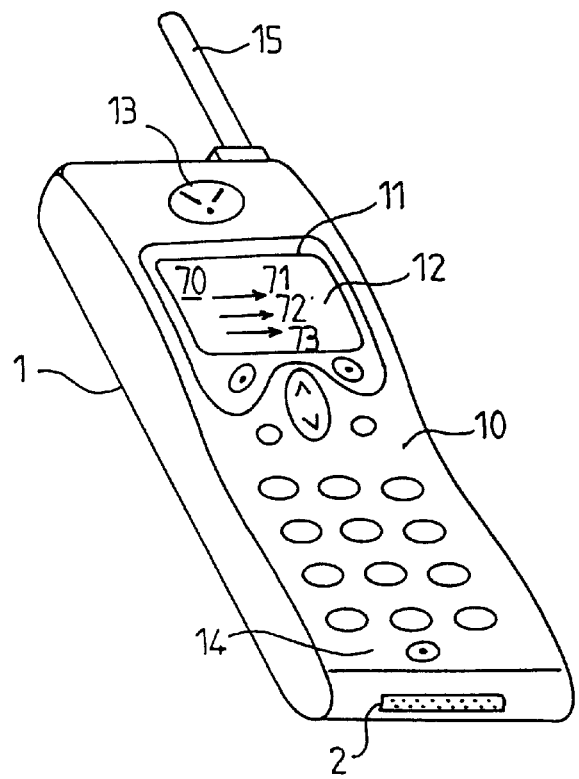
FIGS. 1 and 2 represent a telephone according to the invention.
Figure 2:
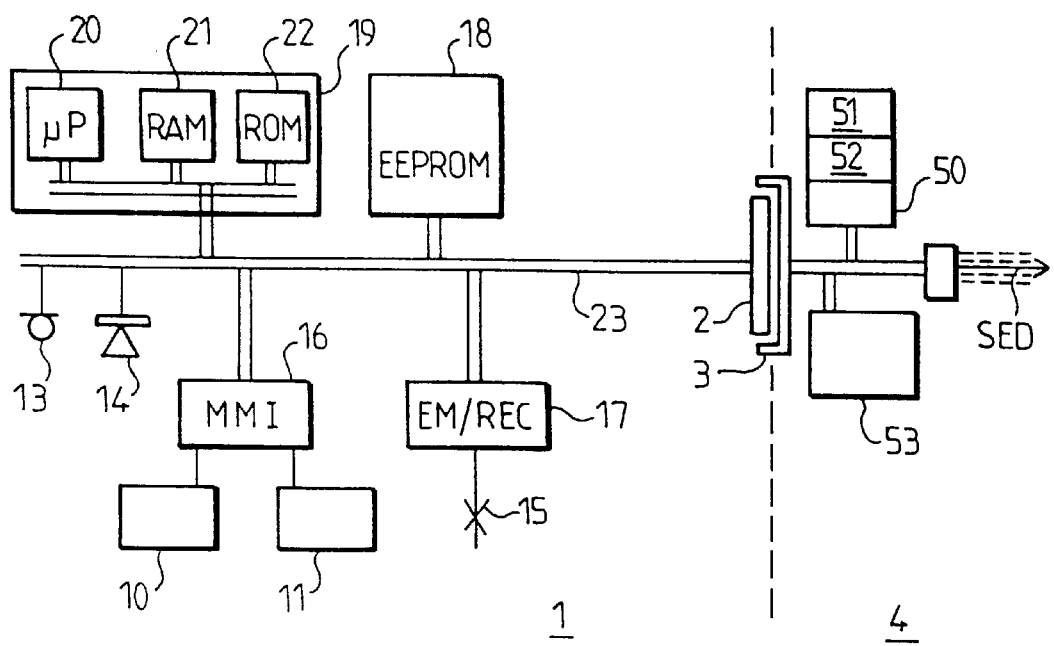

In FIGS. 1 and 2 is diagrammatically shown a portable telephone and a fastener element according to the invention. The telephone 1 comprises a female connector 2 intended to be connected to a male connector 3 of the fastener element 4 which is intended to be installed in a vehicle 5 for receiving the telephone 1 (see FIG. 5). The telephone 1 also includes a keyboard 10, a display 11 which notably makes it possible to display a menu of use 12 of the telephone, an earphone 13, a microphone 14 and an antenna 15. The keyboard 10 and the display 11 are connected to a man/machine interface management circuit 16 of the telephone. The antenna 15 is connected to a transceiver circuit 17. The telephone 1 also includes an EEPROM memory 18 and a microprocessor assembly 19 which contains an actual microprocessor 20, a read/write memory (or RAM) 21, and a read-only memory (ROM) 22. The read-only memory 22 notably contains the usual instructions which permit to ensure the operation of the telephone and also instructions for implementing the invention. The connector 2, the earphone 13, the microphone 14, the circuits 16 and 17, the memory EEPROM 18 and the microprocessor assembly 19 are connected to a bus 23.

Figure 3:
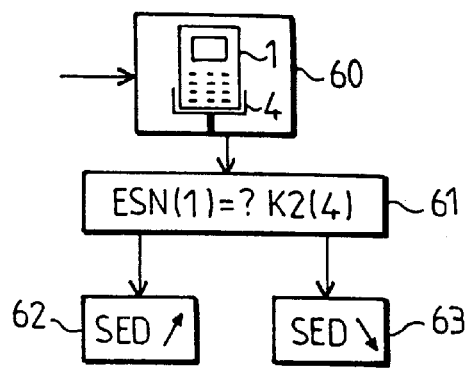
FIG. 3 represents various steps for implementing an anti-theft method according to the invention.

The fastener element 4 comprises a memory 50 which has at least two locations 51 and 52 intended to store a code K1 chosen by the user, on the one hand, and a characteristic of the telephone K2, on the other. The code K1 is a security code used for verifying the identity of the user of the telephone before any modification of the parameters of the method according to the invention. The characteristic K2 is formed, for example, by the ESN number (Electrical Serial Number) of the telephone when an analog telephone is concerned, or by its IMEI number (International Mobile Equipment Identity) for a digital telephone. This number is assigned to the telephone by the manufacturer and permits the identification which is unique in the world. The fastener element 4 delivers a data SED to the vehicle 5 which data is used by the vehicle 5 for blocking/unblocking the start of the vehicle (see FIG. 5) and which is determined by the telephone in the following manner (see FIG. 3): for starting the vehicle, the user is to put his portable telephone in the fastener element 4 (step 60). The telephone then compares its ESN number or IMEI number with the one that is stored at location 52 (step 61). If they match, it delivers an active signal SED (step 62). If not, it delivers an inactive signal SED (step 63).

In FIG. 2 the usual functions of a fastener element 4 are combined in a box 53, notably the switching of voice to an external loudspeaker and microphone installed in the vehicle. These functions do not occur in the invention and are thus not described in more detail here.

In accordance with the invention, the menu 12 notably contains an "antitheft" item 70 which permits the user to set and thereafter modify the parameters of a method according to the invention. This item 70 contains the following three entries in the example described here:

→71: initialization
→72: modification
→73: activation/deactivation.

Figure 4:
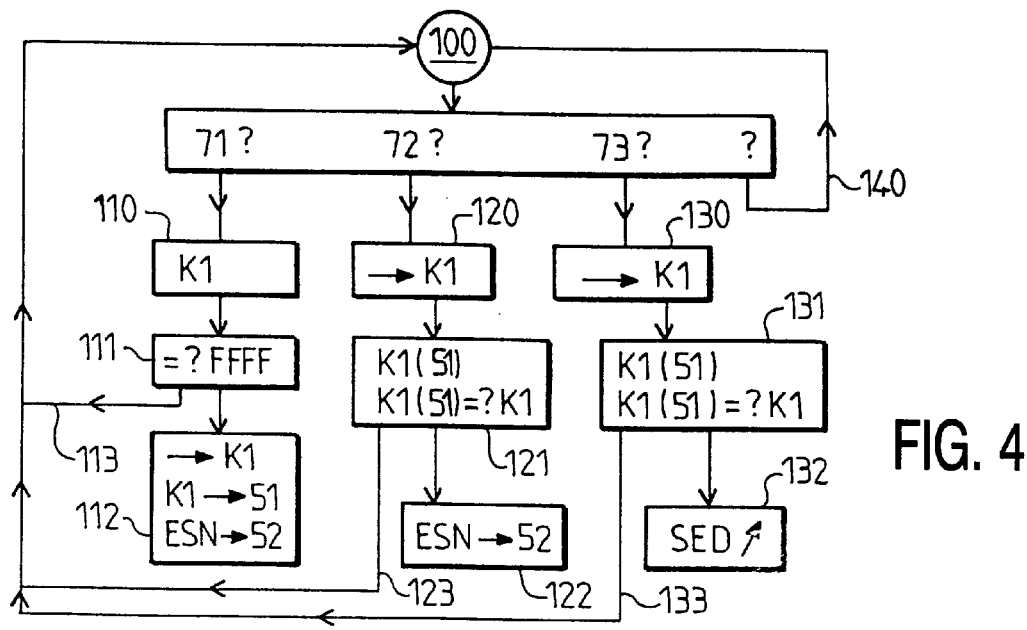
FIG. 4 represents various steps for the start, the modification and the activation/deactivation of an anti-theft method according to the invention, and FIG. 5 diagrammatically shows a basic circuit diagram for the start of a vehicle, and a fastener element for fastening a telephone to this vehicle.

The user is likely to select one of these three entries. The telephone (previously connected to the fastener element 4) thus carries out the following operations which are summarized in FIG. 4:

100: the telephone is in the standby mode,

101: when the user carries out an operation, there is determined whether this operation corresponds to the selection of one of the entries 71, 72 or 73.

Selection of entry 71 for initializing the anti-theft method:

110: reading of the values of KI and K2 stored at locations 51, 52 of the memory 50.

111: comparison of the values read with the (hexadecimal) default value FFFF which is recorded in the memory at the locations 51 and 52 before the first initialization.

112: if the values read are equal to FFFF: the user is asked to dial a code of his own choice; then the dialled code is automatically written in the memory 50 at the location 51, and the ESN or IMEI characteristic of the telephone which is connected to the fastener element 4 in the memory 50 is automatically written at location 52.

113: if not, return to step 100.

Selection of entry 72 for modifying the stored characteristic:
120: the user is asked to dial his code.
121: the code stored at location 51 is read and compared to the dialled code.
122: if they match, the ESN or IMEI characteristic of the telephone which is connected to the fastener element 4 in the memory 50 is automatically written at location 52.
123: if they are different, the operation is resumed at step 100.
Selection of entry 73 for deactivating the anti-theft method:
130: the user is asked to dial his code.
131: the code stored at location 51 is read and compared with the dialled code.
132: if they match, the anti-theft method is deactivated by forcing the output SED of the fastener element.
133: if they are different, the method is not deactivated and the operation is resumed at step 100.
Other operation:
140: the operation is resumed at step 100.

Figure 5:
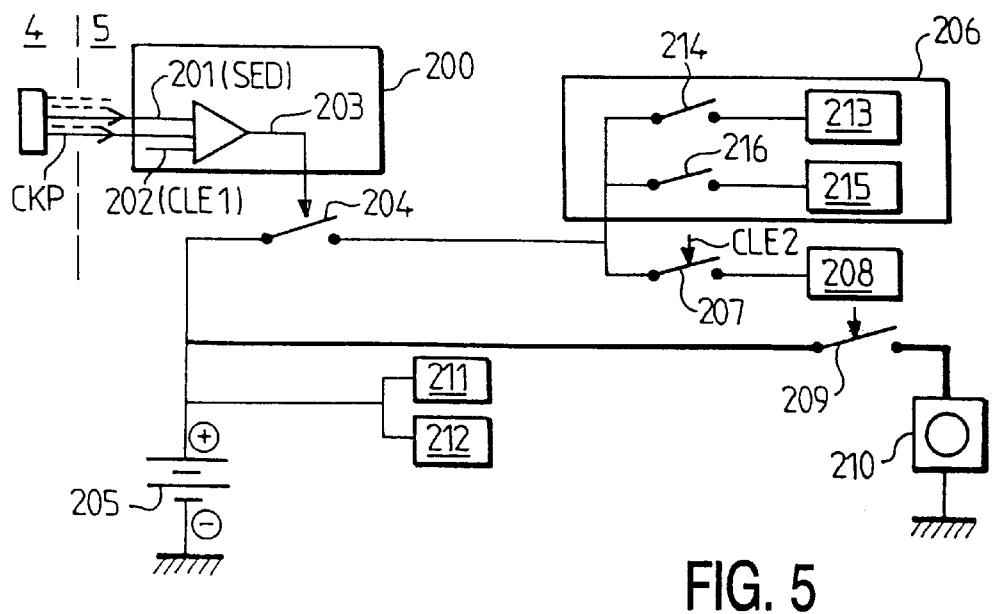

In FIG. 5 is shown a basic circuit diagram of a starter circuit of a vehicle. This circuit comprises a logic AND gate 200 which receives on a first input 201 the signal SED supplied on the output of the fastener element 4 and on a second input 202 a signal CLE1 which is inactive when the ignition key of the vehicle is in a first position called stop position, and which is active when it is in a second position called rest position and in a third position called start position. An output 203 of the gate 200 controls a first switch 204 which, when closed, puts a battery 205 into contact with a circuit 206 called rest circuit, on the one hand, and with a second switch 207, on the other. The switch 207 is controlled by a signal CLE2 which is active when the ignition key of the vehicle is in the start position. When the switches 204 and 207 are closed, the battery 205 is put into contact with a relay 208 which controls a third switch 209. The switch 209, when closed, puts the battery 205 and the start system 210 into contact. In addition, the battery 205 is in permanent contact with various circuits, for example, with a clock circuit 211 and an emergency circuit 212. The rest circuit 206 comprises various circuits arranged in parallel and controlled by switches. By way of example, FIG. 5 shows a headlight circuit 213 which is controlled by a switch 214, and a car radio circuit 215 which is controlled by a switch 216.

The starter system of the vehicle is only unblocked when the signal SED delivered to the input 201 of the AND gate 200 is active. When it is inactive, the switch 204 is still open: the starter system 210 is thus not brought into contact with the battery 205 when the user places his ignition key in a start position. Thus, the starter means of the vehicle are blocked.

In another advantageous embodiment, the fastener element 4 transmits to the vehicle a data CKP in addition to the data SED. This data CKP indicates the presence or absence of the fastener element 4. The data is conveyed to a third input of the logic AND gate 200 so that the vehicle cannot be started if the fastener element 4 is absent. Thus, a fraudulent person cannot deactivate the anti-theft method according to the invention by disconnecting the fastener element 4 from the vehicle 5.

In another embodiment, this result may be obtained by mechanical means which prevent a disconnection of the fastener element 4 (for example, there may be provided that it is not possible to remove the fastener element without breaking the contact pins).

Finally, in another embodiment, the verifications relating to the security code K1 and the serial number K2 are utilized by the fastener element 4 instead of being used by the telephone 1. This embodiment, however, is less advantageous because it implies providing specific processing means for the fastener element. In the preferred embodiment which has previously been described, the processing means of the telephone are used.

What is claimed is:

1. An anti-theft method for a vehicle with starter means comprising:

inserting a portable telephone in a fastener element connected to said starter means;

comparing telephone data stored in said portable telephone with fastener data stored in said fastener element in response to the inserting act; and providing a signal to said starter means in response to a result of the comparing act.

2. The anti-theft method of claim 1, wherein said telephone data includes an identification number of said portable telephone.

3. The anti-theft method of claim 1, further comprising deactivating blocking of said starter means in response to input of a secret code to said portable telephone, said secret code being stored in said fastener element.

4. The anti-theft method of claim 1, further comprising modifying said fastener data after inputting a secret code to said portable telephone.

5. A portable telephone for implementing an anti-theft method for a vehicle with starter means, said anti-theft method comprising:

inserting said portable telephone in a fastener element connected to said starter means;

comparing telephone data stored in said portable telephone with fastener data stored in said fastener element in response to the inserting act; and providing a signal to said starter means in response to a result of the comparing act.

6. The portable telephone of claim 5, wherein said telephone data includes an identification number of said portable telephone.

7. A fastener element which receives a portable telephone for implementing an anti-theft method for a vehicle with starter means, said anti-theft method comprising:

inserting said portable telephone in said fastener element connected to said starter means;

comparing telephone data stored in said portable telephone with fastener data stored in said fastener element in response to the inserting act; and providing a signal to said starter means in response to a result of the comparing act.

8. The fastener element of claim 7, wherein said telephone data includes an identification number of said portable telephone.

* * * * *